(12) United States Patent
Rahamim et al.

(10) Patent No.: US 6,389,135 B1
(45) Date of Patent: May 14, 2002

(54) METHOD AND APPARATUS FOR DERIVING POWER FROM A CLOCK SIGNAL COUPLED THROUGH CAPACITORS

(75) Inventors: Raphael Rahamim, Orange; Thomas Grey Beutler, Tustin, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/161,209

(22) Filed: Sep. 25, 1998

(51) Int. Cl.[7] .......................... H04M 1/00; H04M 11/00
(52) U.S. Cl. ................ 379/412; 379/93.05; 379/93.29; 379/98; 379/399; 379/412
(58) Field of Search ............... 379/98, 93.29, 379/399, 93.05, 412

(56) References Cited

U.S. PATENT DOCUMENTS

| | | | | |
|---|---|---|---|---|
| 4,989,236 A | * | 1/1991 | Myllymaki | 379/98 |
| 5,600,551 A | | 2/1997 | Luscher, Jr. | |
| 5,654,984 A | * | 8/1997 | Hershbarger et al. | 375/257 |
| 5,870,046 A | * | 2/1999 | Scott et al. | 341/143 |
| 6,008,681 A | * | 12/1999 | Beutler et al. | 327/304 |
| 6,081,586 A | * | 6/2000 | Rahamim et al. | 379/93.29 |

FOREIGN PATENT DOCUMENTS

EP    0540 947 A2    5/1993

OTHER PUBLICATIONS

Charge Pumps Get New Life, Darrington P., Electronics World and Wireless World, GB, Reed Business Publishing, Sutton, Surrey, vol. 13, No. 1736, pp. 668–670, Aug. 1997.

* cited by examiner

Primary Examiner—Forester W. Isen
Assistant Examiner—Ramnandan Singh
(74) Attorney, Agent, or Firm—Procopio, Cory, Hargreaves & Savitch LLP

(57) ABSTRACT

A high voltage isolation barrier includes first and second capacitors, each having a first terminal connected to a system-side input signal source. A first diode is connected between second terminals of the first and second capacitors, and a second diode is connected to the second terminal of the first capacitor and to a first terminal of a third capacitor. Application of an alternating polarity squarewave across the first terminals of the first and second capacitors results in generation of a line side voltage on the third capacitor and in transfer of a clock signal at the squarewave frequency across the isolation barrier to the line side.

9 Claims, 3 Drawing Sheets

VOLTAGE WAVEFORM BETWEEN TERMINALS 13 & 11

METHOD AND APPARATUS FOR DERIVING POWER FROM A CLOCK SIGNAL COUPLED THROUGH CAPACITORS

BACKGROUND OF THE INVENTION

1. Field of the Invention

The subject invention relates generally to the field of communications and more particularly to circuitry designed to provide power and a clock signal across a high voltage isolation barrier.

2. Description of Related Art

Digital telephone coder-decoder circuits [CODEC's] are known in the prior art for performing digitization of voice signals. In order to operate a CODEC connected directly to a telephone line, it is necessary to provide a system clock and power to the line side of the high voltage isolation barrier. For a variety of reasons, locating a CODEC on the line side of the high voltage isolation barrier appears to the inventors to be a good approach to creating a VLSI device for a low cost, high performance telephone interface.

Conventionally, power has been transferred across the high voltage isolation barrier by a DC-to-DC converter or derived from the telephone line loop current. A system clock is sent across the barrier by a separate electrical circuit, extracted from the data, or generated locally on the line side, which is both expensive and inaccurate.

SUMMARY OF THE INVENTION

According to the invention, a capacitive isolation device is constructed having a voltage rating selected for such purpose. A charge storage device is provided for accumulating charge and developing a line side voltage. The circuit is further designed such that when the capacitive isolation device is driven by a voltage signal of alternating polarity located on the system side of the barrier, the charge storage device accumulates a charge which produces the line side voltage, while at the same time a clock signal at the frequency of the signal of alternating polarity is transferred to the line side.

The invention further contemplates connecting first circuitry to the system side of a telephone line interface which facilitates transmission of a digital signal to the line side of the interface, as well as provides isolation between the system side and the line side, and then connecting said first circuitry to second circuitry which stores a voltage in response to application of the digital signal to the first circuitry.

The approach of the invention can be advantageously employed to provide a very reliable clock signal from a source on the system side of the high voltage isolation barrier to a CODEC or other component located on the line side of the high voltage isolation barrier. Jitter and duty cycle changes are minimal. When the CODEC is not operating, inactive sections of the line side VLSI device are preferably shut down by a system control circuit to conserve power.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art.

Figure 1:
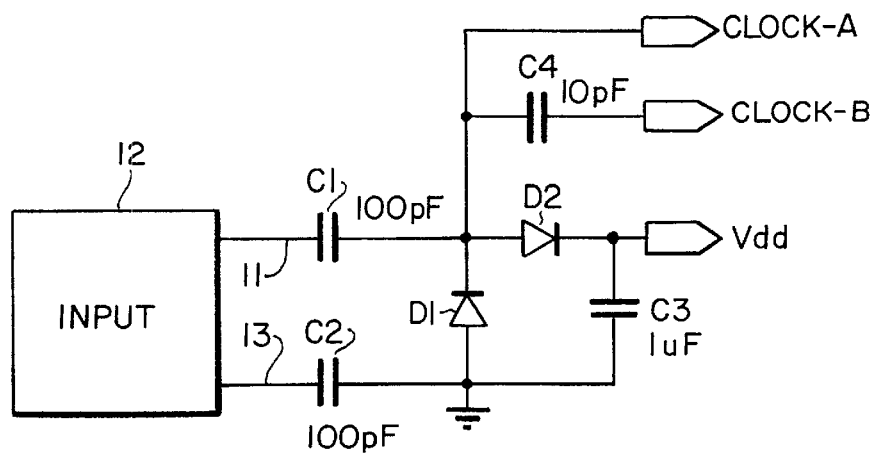
FIG. 1 is a circuit diagram illustrating the preferred embodiment of the invention.

The preferred embodiment of the invention is illustrated in FIG. 1. The circuit includes a capacitive isolation device, which in the preferred embodiment comprises first and second capacitors C1, C2. A first terminal 11 of the first capacitor C1 is connected to receive an input signal, as is the first terminal 13 of the second capacitor C2. The second terminal of the first capacitor C1 is connected to the cathode of a diode D1, while the second terminal of the second capacitor C2 is connected to the anode of the diode D1.

The circuit of FIG. 1 further includes a charge storage device comprising a third capacitor C3. A first terminal of the third capacitor C3 is connected to the anode of the diode of D1. A second terminal of the third capacitor C3 is connected to the cathode of a second diode D2 whose anode is connected to the second terminal of the capacitor C1.

In operation, the voltage developed across the third capacitor C3 constitutes the output voltage VDD of the circuit, which is supplied to a line side device such as a CODEC. A digital signal, comprising in this case a system clock signal, for example for the CODEC, is tapped off the second terminal of the first capacitor C1. The clock signal may be either used directly, i.e., clock A or filtered by a capacitor C4, i.e., clock B. In other embodiments, the digital signal could be a data signal.

Figure 2:
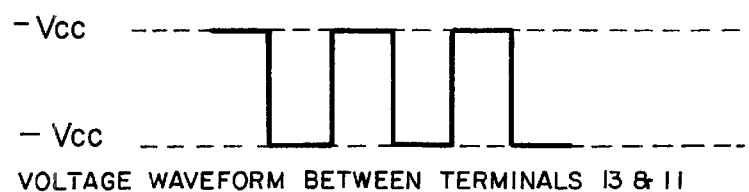
FIG. 2 is a waveform diagram useful in illustrating operation of the preferred embodiment of the invention.

The circuit of FIG. 1 is driven by an input 12 which preferably comprises a square wave signal, as shown in FIG. 2. The signal preferably applies a voltage of VCC to terminal 11 while terminal 13 is at 0 volts and then switches such that terminal 13 sees a voltage of VCC volts, while terminal 11 sees a voltage of 0 volts. The voltage VCC may be, for example, 5 volts in a specific embodiment of the invention.

Figure 3:
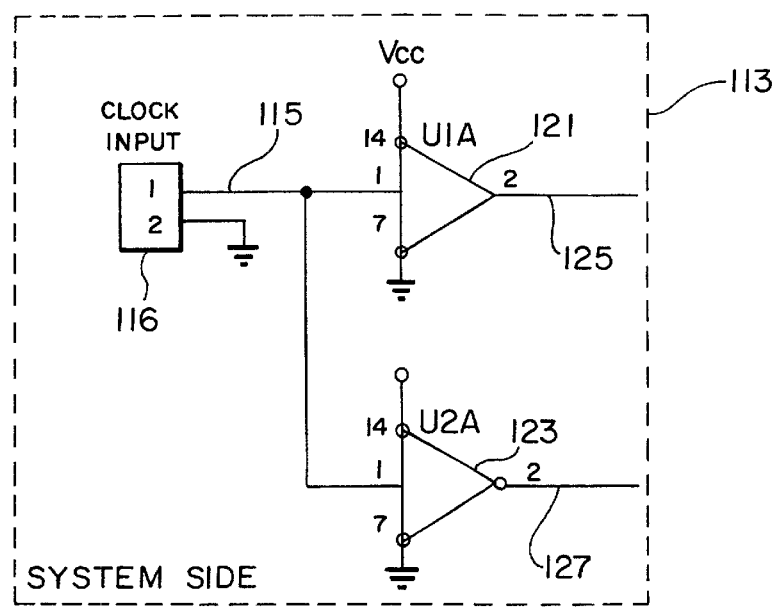
FIG. 3 is a circuit diagram of an input circuit useful in the embodiment of FIG. 1.

The voltage VCC may be supplied by a driver circuit 113, as shown in FIG. 3. The driver circuit 113 receives an input on a line 115 from the system clock 116, which provides a system clock signal at a frequency of, for example, 4 MHz. The system clock signal is provided via line 115 to the input of a noninverting driver 121 and via line 119 to the input of an inverting driver 123. The output 125 of the noninverting driver 123 is connected to the first terminal 11, while the output 127 of the inverting driver 123 is connected to the second terminal 13. Each respective driver 121, 123 is connected to the source voltage VCC.

Figure 4:
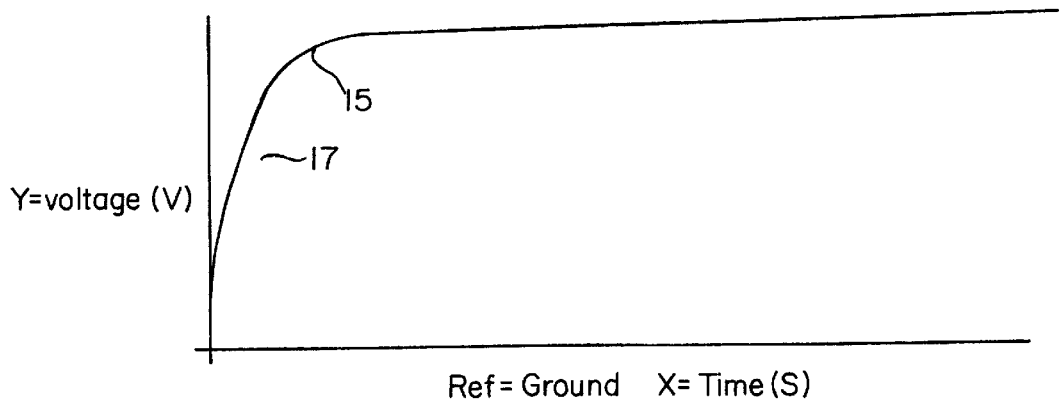
FIG. 4 is a waveform diagram useful in illustrating operation of the preferred embodiment of the invention.
Figure 5:
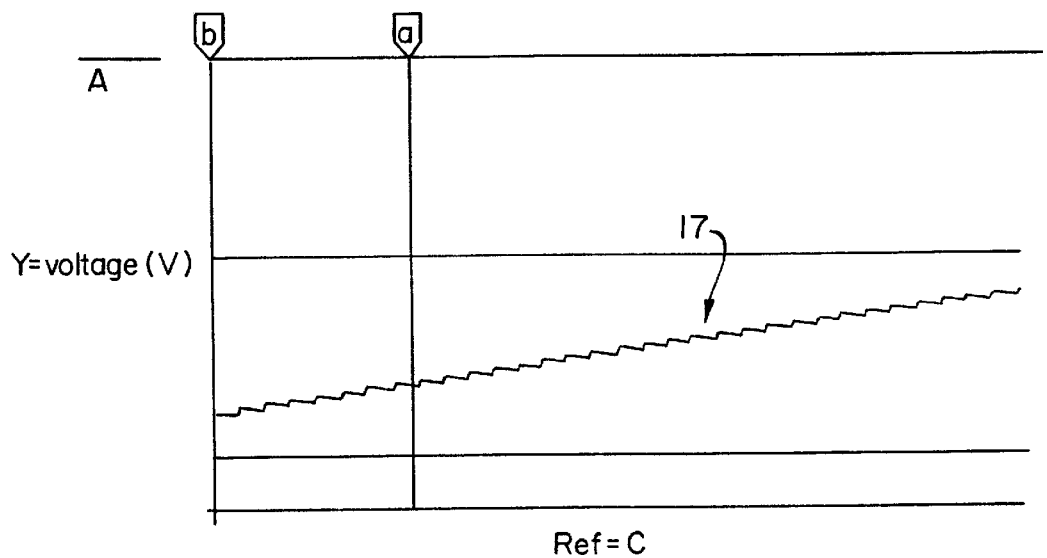
FIG. 5 is an enlarged view of a portion 17 of the waveform of FIG. 4.

In a specific example, the first and second capacitors C1 and C2 may be 100 picoFarads(pF) while the third capacitor C3 may be 1 microFarad. The fourth capacitor C4, if provided, may be 10 picoFarads(pF). The frequency of the input signal may be 4 megahertz (MHz). In such case, the output waveform across the third capacitor C3 appears as shown in FIG. 4. Essentially, when the voltage VCC appears at terminal 11 of the first capacitor C1, the first capacitor C1 receives an incremental charge equal to, in the example under discussion, 1/10,000 of VCC. When the voltage switches, such that terminal 13 is at VCC relative to terminal 11, the first capacitor C1 is discharged and prepared for another incremental charge, which adds another 1/10,000 of VCC to the third capacitor C3. At 4 MHz this second charge is added 0.25 microseconds after the first charge. Accordingly, the voltage across the capacitor C3 incrementally steps up with each cycle of the squarewave input as illustrated in FIG. 4 and in FIG. 5 which is a blown-up depiction of a region 17 of FIG. 4. After a time interval determined by the values of the components and the load, the voltage across the third capacitor C3 reaches the VCC level.

It will be observed that the diodes D1, D2 facilitate the foregoing operation. In particular, the series diode D2 allows charging current to flow to the third capacitor C3 during half cycles where the terminal 11 is VCC, while the diode D1 enables discharging the coupling capacitors C1, C2 on the alternate half cycles when terminal 13 is at VCC.

The first and second capacitors C1 and C2 provide a high voltage isolation barrier. For example, if the barrier is to be 1,000 volts, the first and second capacitors C1, C2 are rated for 1,000 volts, whereas if the barrier is to be 2,000 volts, the capacitors C1, C2 would be rated at 2,000 volts. The values of the first and second capacitors C1 and C2 themselves are only important to determining how much power can be transferred across the barrier. For example, if the 100 pF value for C1 and C2 is changed to 1,000 pF, more power will be transferred across the barrier. The value of the third capacitor C3 affects how much ripple will appear in the voltage VDD. For example, if the third capacitor C3 is increased to 100 microFarads, a much lower ripple will be experienced. How quickly the staircase waveform of FIGS. 4 and 5 rises depends on the values of the capacitors C1, C2, C3 and the load.

A significant advantage of the circuit of FIG. 1 is that it permits the harnessing of power which would otherwise be wasted in transmitting the clock across the high voltage interface. Thus, a high frequency system clock and a useful supply voltage is transferred by the circuit of the preferred embodiment to the line side of the telephone interface.

The circuit of the present embodiment provides high voltage isolation. For example, it could provide 1500 volt isolation via use of 1500 v capacitors C1, C2 for lightning protection as required FCC Part 68, subpart D. Typically, the system side is grounded to earth ground through a power cord or other means. The preferred embodiment permits the tip and ring of a modem, for example, which resides on the line side to go up to 1500 volts, while the system side stays at ground level.

Figure 6:
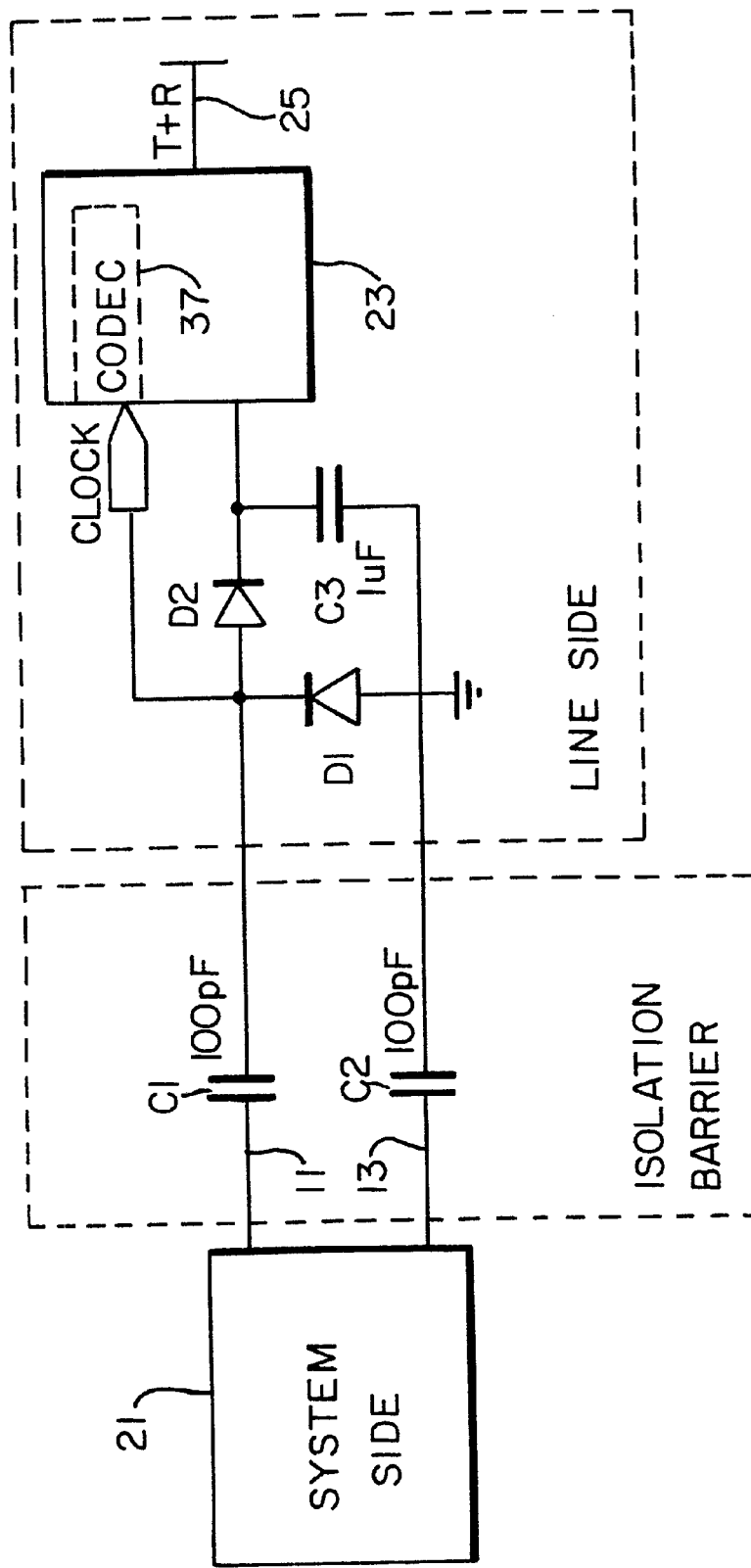
FIG. 6 is a circuit schematic illustrating an application of the preferred embodiment of FIG. 1.

FIG. 6 illustrates a system implementation of the circuit of FIG. 1. In this implementation, the terminals 11 and 13 of the capacitors C1 and C2 are connected to a system-side apparatus 21, which may comprise, for example, a computer, a modem or a fax machine. The output of the circuit of FIG. 1 is shown connected to a voltage supply point of a data access arrangement (DAA) 23 which receives the tip and ring lead 25 from the telephone company. As indicated above, the DAA may include a VLSI CODEC circuit. By application of the preferred embodiment, the 4 MHz system clock frequency appearing on the system side is made to appear on the line side for supply to the VLSI CODEC circuit 37.

Those skilled in the art will appreciate that embodiments according to the invention can employ periodic waveforms other than a squarewave, and can, in fact, employ non-periodic waveforms, as long as the waveform or signal includes transitions therein to create a charging/discharging operation such as that facilitated by the diodes D1 and D2 in the preferred embodiment.

Those skilled in the art will thus appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Circuitry transferring power and a digital signal from a system side to a line side of a telephone line interface circuit comprising:
   a capacitive isolation device having a voltage rating selected for providing a desired level of isolation, said capacitive isolation device comprising a first capacitor having a first terminal coupled to a first output of said system side, and a second capacitor having a first terminal coupled to a second output of said system side;
   a charge storage device comprising a third capacitor for developing a supply voltage for supply to said line side; and
   a diode circuit comprising a first diode having its cathode coupled to a second terminal of said first capacitor and its anode coupled to a second terminal of said second capacitor to allow discharging of said first and second capacitors when said second output of said system side is at a high voltage level relative to said first output of said system side, and a second diode having its anode coupled to said first capacitor and its cathode coupled to said third capacitor to allow charging current to flow to said third capacitor when said fist output of said system side is at a high voltage level relative to said first output of said system side.

2. A circuit for establishing an isolation barrier and enabling transmission of power and a clock signal across the barrier comprising:
   first and second capacitors, each having a fist terminal connected to an input signal source, each of said first and second capacitors having a respective second terminal;
   a first diode connected between the second terminals of said first and second capacitors;
   a second diode connected to the second terminal of said first capacitor and to a first terminal of a third capacitor, the third capacitor having a second terminal connected to the second terminal of said second capacitor; and a fourth capacitor connected to the second terminal of said first capacitor and to a clock signal input of a line side device.

3. The circuit of claim 2 further including a signal line connected to the second terminal of said first capacitor and to a clock signal input of a line side device.

4. The circuit of claim 2 wherein the line side device comprises a CODEC.

5. The circuit of claim 2 wherein the first terminal of said third capacitor is connected to a voltage supply point of said line side device.

6. The circuit of claim 5 where said line side device comprises a CODEC.

7. The circuit of claim 2 further including a square wave generator connected to the first terminals of said first and second capacitors.

8. The circuit of claim 7 wherein said square wave generator applies a selected voltage level and a zero voltage level in an alternating fashion to the respective said first terminals.

9. The circuit of claim 8 where said line side device comprises a CODEC.

* * * * *